C. M. LLOYD.
TIRE.
APPLICATION FILED DEC. 26, 1912.

1,084,864.

Patented Jan. 20, 1914.

WITNESSES

INVENTOR
CRISTINA MABEL LLOYD
BY
ATTORNEY

UNITED STATES PATENT OFFICE.

CRISTINA MABEL LLOYD, OF LONDON, ENGLAND.

TIRE.

1,084,864. Specification of Letters Patent. Patented Jan. 20, 1914.

Application filed December 26, 1912. Serial No. 738,670.

*To all whom it may concern:*

Be it known that I, CRISTINA MABEL LLOYD, a citizen of the United Kingdom of Great Britain and Ireland, and resident of the Ladies Automobile Club, Claridge's Hotel, Brook street, London, England, have invented certain new and useful Improvements in Tires, of which the following is a specification, such as will enable others skilled in the art to which it appertains to make and use the same.

This invention relates to woven wire tires for vehicle wheels, and has for its object to provide a practically puncture proof tire capable of use with or without an air tube.

To this end the tire consists of spirally laid wire, in two or more layers, the wires being laid in the same direction, flexible elastic material being laid, for instance spirally, between the wires and in opposite direction so as to cross the wires.

The angle at which the wires and elastic material are laid, the number and size of strands of wire and material, and the number of layers of wire, and material may be varied, as desired, to suit the conditions for which the tire is to be used.

A preferred process of manufacture of my tire is to build it upon a specially prepared soluble core or mandrel of any suitable cross-section. Upon this core the wire or equivalent metal strip is spirally wound at such pitch as may be desired. After the first winding of wire is laid, a winding of the elastic material is placed around it at preferably the same pitch but in the opposite direction, and over this material a second metallic winding is laid, the convolutions of which are midway between those of the first winding and over this second metallic winding flexible material is again wound and this in turn is covered with another metallic winding the said winding being repeated as often as desired. When all the convolutions are laid the core is removed as by the application of superheated steam. It will be obvious that any elastic material such as rubber or the like may be used.

Figure 1:
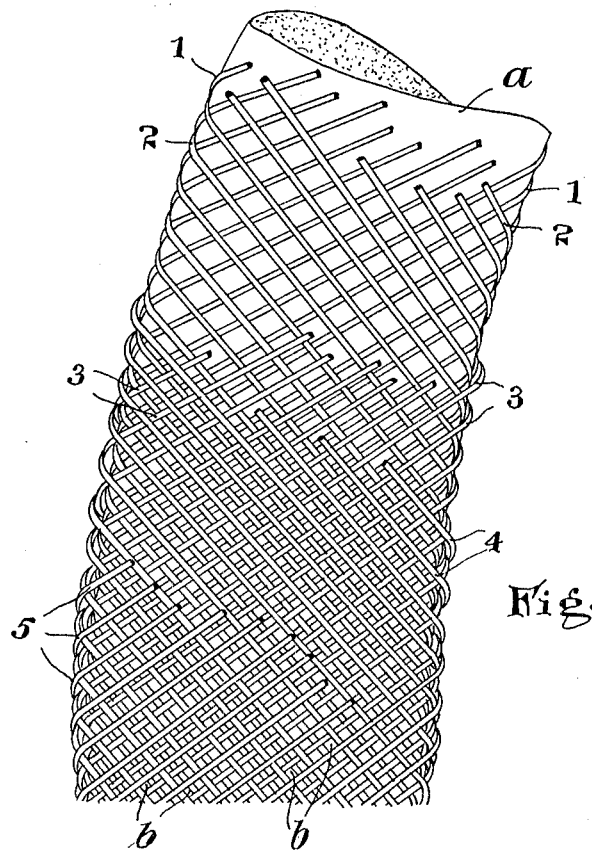
Figure 2:
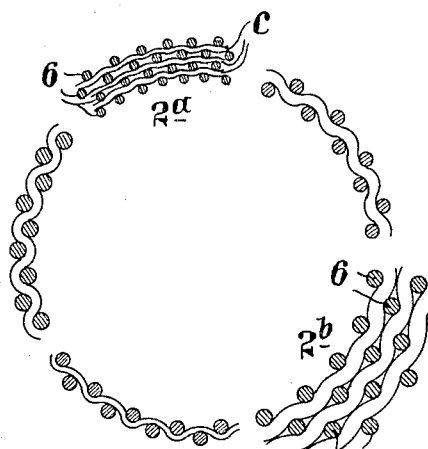

Figure 1 is a side elevation of a portion of a tire on a soluble core; Fig. 2 shows in cross-section various styles of windings.

In Fig. 1 the core $a$ has wound upon it a number of wires 1 over which flexible strips of material 2 are wound in an opposite direction and upon these in the same direction as the first windings another layer metallic windings 3 is made. This metallic layer is again crossed by another set or layer of elastic material 4 and over this in the same direction as layers 1 and 3 another metallic layer 5 is made, each layer of like material being in the same direction, the windings being so laid as to leave equisized or substantially equisized interstices $b$ throughout the finished tire through which the soluble core $a$ is removed.

Fig. 2 illustrates various forms and sizes of the windings for example a portion $2^a$ shows four layers of windings 6 of wire and between these three layers of windings $c$ of elastic material, while $2^b$ illustrates similar windings on a larger scale, the other three windings showing various styles of two layers of windings of metallic material and one of elastic material.

In these drawings the metallic substance is illustrated by round wire and the flexible material is also illustrated as round in cross-section but it will be obvious that metallic material and flexible material of any suitable cross sectional shape may be used.

What I claim and desire to secure by Letters Patent is:—

1. A tire for the wheels of vehicles comprising a plurality of spiral wires laid one over the other with their wires parallel and a plurality of elastic cords spirally wound in a direction opposite to that of the wires and placed between the layers of wires.

2. A tire for the wheels of vehicles comprising a plurality of metal strips spirally and similarly wound having interposed between them a plurality of strips of elastic material oppositely wound.

3. A tire for wheels comprising a plurality of layers of spiral wire laid one layer over the other; and a layer of elastic cords interposed between adjacent layers of the wire and spirally wound in a direction opposite to that of the cords, the wires of one layer being staggered relative to the wires of the adjacent layer.

In witness whereof I have hereunto set my hand in presence of two witnesses.

CRISTINA MABEL LLOYD.

Witnesses:
MAGDELEIN A. DE LUNAY,
ALEX. THAYER.